(12) United States Patent
Fleischman et al.

(10) Patent No.: US 9,753,923 B2
(45) Date of Patent: *Sep. 5, 2017

(54) TOPIC AND TIME BASED MEDIA AFFINITY ESTIMATION

(71) Applicant: Bluefin Labs, Inc., Cambridge, MA (US)

(72) Inventors: Michael Ben Fleischman, Somerville, MA (US); Deb Kumar Roy, Arlington, MA (US); Jeremy Rishel, Maynard, MA (US); Anjali Midha, Winchester, MA (US); Matthew Miller, Malden, MA (US)

(73) Assignee: BLUEFIN LABS, INC., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/664,719

(22) Filed: Mar. 20, 2015

(65) Prior Publication Data

US 2015/0193437 A1 Jul. 9, 2015

Related U.S. Application Data

(63) Continuation of application No. 14/067,589, filed on Oct. 30, 2013, now Pat. No. 9,009,130, which is a
(Continued)

(51) Int. Cl.
*G06F 17/30* (2006.01)
*G06Q 50/00* (2012.01)
*G06Q 30/02* (2012.01)

(52) U.S. Cl.
CPC .. *G06F 17/30017* (2013.01); *G06F 17/30029* (2013.01); *G06Q 30/0278* (2013.01); *G06Q 50/01* (2013.01); *G06F 17/30528* (2013.01)

(58) Field of Classification Search
CPC .............. G06F 17/30029; G06F 17/30528
(Continued)

(56) References Cited

U.S. PATENT DOCUMENTS 6,816,906 B1 * 11/2004 Icken ................. G06F 21/6218
705/1.1
7,406,692 B2 * 7/2008 Halpern ............... G06F 9/505
709/201

(Continued)

OTHER PUBLICATIONS

PCT International Search Report and Written Opinion, PCT Application No. PCT/US12/46730, Sep. 21, 2012, 15 pages.
(Continued)

*Primary Examiner* — Frantz Coby
(74) *Attorney, Agent, or Firm* — Fenwick & West LLP

(57) ABSTRACT

An affinity server estimates an affinity between two different time based media events (e.g., TV, radio, social media content stream), between a time based media event and a specific topic, or between two different topics, where the affinity score represents an intersection between the populations of social media users who have authored social media content items regarding the two different events and/or topics. The affinity score represents an estimation of the real world affinity between the real world population of people who have an interest in both time based media events, both topics, or in a time based media event and a topic. One possible threshold for including a social media user in a population may be based on a confidence score that indicates the confidence that one or more social media content items authored by the social media user are relevant to the topic or event in question.

27 Claims, 8 Drawing Sheets

Related U.S. Application Data continuation of application No. 13/548,901, filed on Jul. 13, 2012, now Pat. No. 8,600,984.

(60) Provisional application No. 61/507,520, filed on Jul. 13, 2011.

(58) Field of Classification Search
USPC ......... 707/705–710, 722; 709/201, 203, 213, 709/217
See application file for complete search history.

(56) References Cited

U.S. PATENT DOCUMENTS

| | | | |
|---|---|---|---|
| 7,747,620 B2* | 6/2010 | Beaupre | G06F 17/30766 707/734 |
| 8,516,374 B2 | 8/2013 | Fleischman et al. | |
| 8,543,454 B2 | 9/2013 | Fleischman et al. | |
| 8,600,984 B2* | 12/2013 | Fleischman | G06Q 50/01 707/705 |
| 8,606,776 B2* | 12/2013 | Steiner | G06F 17/30528 707/723 |
| 8,612,293 B2* | 12/2013 | Benyamin | G06Q 30/0246 705/14.49 |
| 8,856,030 B2 | 10/2014 | Russek | |
| 8,880,555 B2 | 11/2014 | Tseng | |
| 8,892,648 B1 | 11/2014 | Durham et al. | |
| 9,009,130 B2* | 4/2015 | Fleischman | G06Q 50/01 707/705 |
| 9,111,259 B2* | 8/2015 | Sylvain | G06Q 10/107 |
| 9,135,666 B2* | 9/2015 | Benyamin | G06Q 50/01 |
| 9,196,008 B2* | 11/2015 | Baldwin | G06Q 10/10 |
| 9,485,285 B1* | 11/2016 | Fukujima Goto | G06F 3/0482 |
| 2009/0327437 A1 | 12/2009 | Estrada | |
| 2010/0121843 A1 | 5/2010 | Goeldi | |
| 2010/0205057 A1 | 8/2010 | Hook et al. | |
| 2010/0211458 A1 | 8/2010 | Ramer et al. | |
| 2011/0040760 A1 | 2/2011 | Fleischman et al. | |
| 2011/0041080 A1 | 2/2011 | Fleischman et al. | |
| 2011/0314041 A1* | 12/2011 | Drucker | G06Q 30/02 707/769 |
| 2012/0004959 A1* | 1/2012 | Benyamin | G06Q 30/0241 705/14.4 |
| 2012/0192227 A1 | 7/2012 | Fleischman et al. | |
| 2012/0215903 A1 | 8/2012 | Fleischman et al. | |
| 2012/0299925 A1* | 11/2012 | Najork | G06T 11/206 345/440 |
| 2013/0073480 A1 | 3/2013 | Sastri et al. | |
| 2013/0086489 A1 | 4/2013 | Fleischman et al. | |
| 2013/0125159 A1 | 5/2013 | Elizarov et al. | |
| 2014/0089320 A1* | 3/2014 | Baldwin | G06F 17/30867 707/748 |

OTHER PUBLICATIONS

Bouthemy, P. et al., "A Unified Approach to Shot Change Detection and Camera Motion Characterization," IEEE Trans. on Circuits and Systems for Video Technology, Oct. 1999, vol. 9, No. 7.

Fleischman, M. et al., "Unsupervised Content-Based Indexing of Sports Video Retrieval," 9.sup.th ACM Workshop on Multimedia Information Retrieval (MIR), Augsburg, Germany, Sep. 2007, 9 pages.

Fleischman, M. et al., "Grounded Language Modeling for Automatic Speech Recognition of Sports Video," Proceedings of the Association of Computational Linguistics (ADL), HLT/NAACL. Columbus, OH. Jun. 2008, pp. 121-129.

Hauptmann, A. et al., "Story Segmentation and Detection of Commercials in Broadcast News Video," ADL-98 Advances in Digital Libraries Conference, Santa Barbara, CA, Apr. 22-24, 1998, 12 pages.

Jacobs, A. et al., Automatic Shot Boundary Detection Combining Color, Edge, and Motion Features of Adjacent Frames, Center for Computing Technologies, Bremen, Germany, 2004, 10 pages.

Pang B. et al., "Opinion Mining and Sentiment Analysis," Foundations and Trends in Information Retrieval, 2008, pp. 1-135, vol. 2, No. 1-2.

Tardini et al., "Shot Detection and Motion Analysis for Automatic MPEG-7 Annotation of Sports Videos," 13th International Conference on Image Analysis and Processing, Nov. 2005, 8 pages.

United States Office Action, U.S. Appl. No. 14/067,589, Aug. 13, 2014, 22 pages.

* cited by examiner

TOPIC AND TIME BASED MEDIA AFFINITY ESTIMATION

CROSS-REFERENCE TO RELATED APPLICATION

This application is a continuation of U.S. patent application Ser. No. 14/067,589, filed Oct. 30, 2013, and entitled "TOPIC AND TIME BASED MEDIA AFFINITY ESTIMATION," which is a continuation of U.S. patent application Ser. No. 13/548,901, filed Jul. 13, 2012, and entitled "TOPIC AND TIME BASED MEDIA AFFINITY ESTIMATION," which claims benefit of U.S. Provisional Application No. 61/507,520, filed Jul. 13, 2011, and entitled "BROADCAST MEDIA AUDIENCE AFFINITY ESTIMATION." U.S. application Ser. No. 14/067,589, U.S. patent application Ser. No. 13/548,901 and U.S. Provisional Application No. 61/507,520 are incorporated by reference herein, in their entirety, for all purposes.

FIELD

The present invention relates generally to correlating social media content with time based media events and topics to estimate audience affinities.

BACKGROUND

Online social media services, such as social networking sites, search engines, news aggregators, blogs, and the like provide a rich environment for users to comment on events of interest and communicate with other users. Social media content items authored by users of social networking systems often include references to events that appear in time based media such as television (TV) shows, news reports, sporting events, movies, concert performances, and the like. However, although the content items can sometimes refer to the time based media, the content items themselves typically are isolated from the events and time based media that those content items refer to; for example, the content items appear in online social networks provided over the Internet, while the events occur in other contexts and systems, such as TV programming provided on broadcast systems.

SUMMARY

An affinity server determines an affinity score between two different time based media events (e.g., TV, radio, social media content stream), between a time based media event and a specific topic, or between two different topics, where the affinity score is based on an intersection between the populations of social media users who have authored social media content items regarding the two different events and/or topics. The affinity score represents an estimation of the real world affinity between the real world population of people who have an interest in both time based media events, both topics, or in a time based media event and a topic.

Determining the affinity score between one or more time based media events and/or one or more topics allows advertisers to optimize advertising expenditures in broadcast media by enabling them to more effectively target advertising to audiences based on their affinity for time based media events or topics. Estimations of affinity can also be used by TV networks or advertisers to determine in which TV shows or other broadcast media to place promotions for upcoming programming. Estimations of affinity can also be used by individual users to obtain recommendations for broadcast media they should seek out, based on their own expressed interests in time based media or topics.

To estimate affinity, two populations are created, one for each media event or topic. Each population includes those social media users who have authored social media content items determined to be relevant to the topic or event in question. The threshold for including a social media user in a population may be based on a confidence score that is determined that indicates the confidence that one or more social media content items authored by the social media user are relevant to the topic or event in question. In creating the population, it is assumed that if a social media user has authored one or more social media content item relevant to a event or topic, then that social media user has an interest (or "affinity") to that event or topic.

For example, a population may be created for a TV show, where the population consists of those social media users who have authored at least one social media content item that is determined to be relevant to that TV show. In the case of a topic, a population for a topic consists of those social media users who have authored at least one social media content item that is determined to be relevant to that topic.

The affinity score between the first event or topic and the second event or topic is based on an intersection, in terms of number of social media users, between the two populations, that is users who are members of both populations. Generally, the greater the intersection between the populations, the greater the affinity score between the two events/topics. The affinity score may be normalized based on the sizes of the populations being overlapped, based on the cardinality of the union between the populations, or based on other factors. The affinity score may be further combined with an externally obtained measure of the total real world audience for a first time based media event in order to estimate the real world affinity for a second event or topic in the population at large.

The features and advantages described in this summary and the following detailed description are not all-inclusive. Many additional features and advantages will be apparent to one of ordinary skill in the art in view of the drawings, specification, and claims hereof.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

I. System Overview

Figure 1:
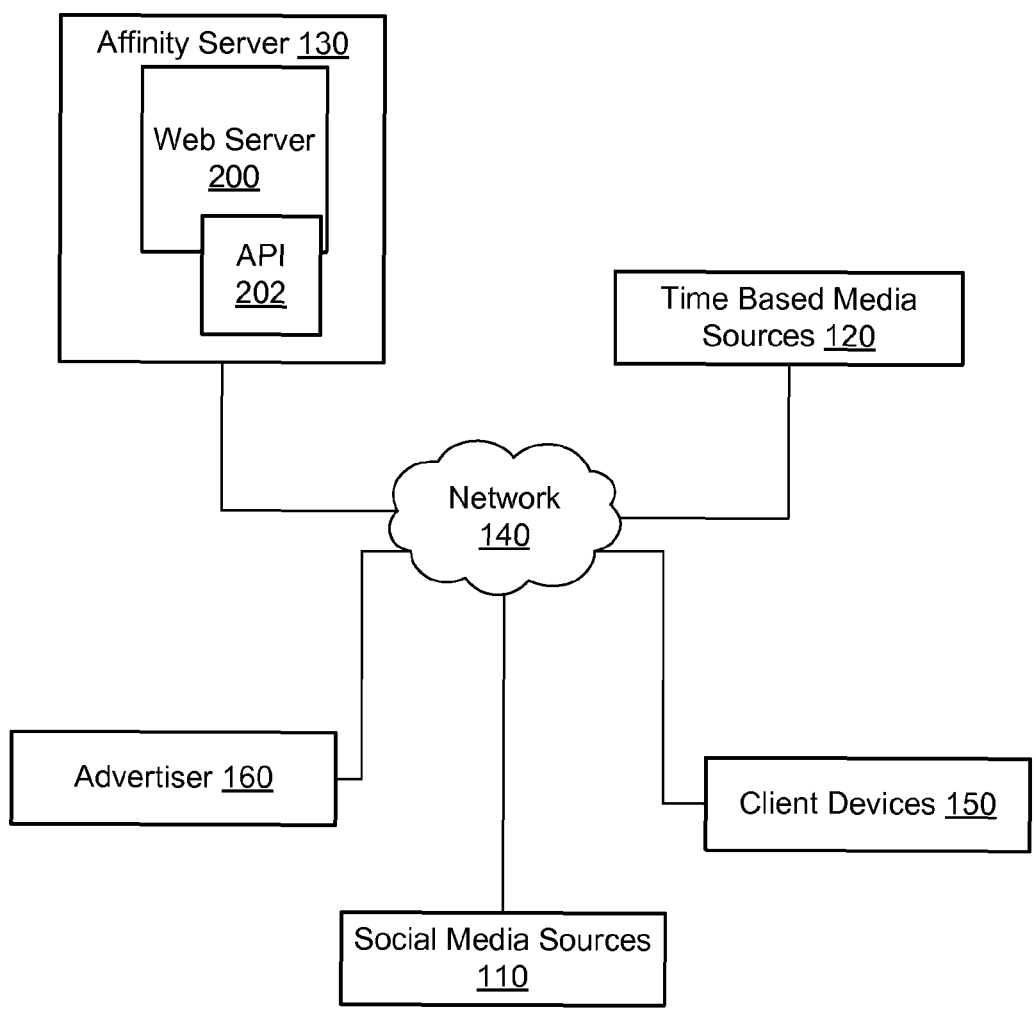
FIG. 1 illustrates the computing environment of one embodiment of a system for estimating the affinity between time based media events or between a time based media event and a topic.

FIG. 1 illustrates the computing environment of one embodiment of a system for estimating the affinity between a first time based media event or topic and a second time based media event or topic. The environment 100 includes social media ("SM") sources 110, time based media sources 120, the affinity server 130, a network 140, client devices 150, advertisers 160.

The SM sources 110 include social networks, blogs, news media, forums, user groups, etc. Examples of SM sources 110 include social networking systems such as Facebook™ and Twitter™. These systems provide a plurality of social media users with the ability to communicate and interact with other SM users of the system.

Using social networking systems, each SM user can author a wide variety of types of SM content items including, for example, posts, videos, photos, links, status updates, blog entries, tweets, profiles, and the like. These SM content items may refer to time based media events or other SM content items (e.g., other posts, etc., pages associated with TV shows or advertisements), other SM users. Through SM content items, SM users can engage in discussions, games, online events, and other participatory services with other SM users. Each SM content item may contain a timestamp indicating a time of creation. SM content items may also include information about the SM user, including biographical information, geographical information, the topics the SM user is interested, or other information. From the social media sources 110 it is possible to determine the author of any given SM content item.

Examples of such SM content items include content items containing audio clips of commentators on, or participants of, another event (e.g., announcers on TV or radio) and text transcriptions thereof (generated manually or automatically), event-related information (e.g., recipes, instructions, scripts, etc.), statistical data (e.g., sports statistics or financial data streams), news articles, and media usage statistics (e.g., user behavior such as viewing, rewind, pausing, etc.).

The time based media sources 120 include media broadcasters, direct content providers, advertisers, and any other third-party providers of time based media content. These sources 120 typically publish content such as television shows (including network, cable, independent, affiliate sources), videos, movies, serials, radio broadcasts, commercials or advertisements in any of foregoing, and any number of other types of audio and video recordings. Time based media sources 120 also provide TV guide programming guide data (or EPG data) containing scheduling information for TV shows as well as metadata regarding the TV shows.

The network 140 may comprise any combination of local area and/or wide area networks, the Internet, or one or more intranets, using both wired and wireless communication systems.

The client devices 150 comprise computing devices that can receive input from a user and can transmit and receive data via the network 140. For example, a client device 150 may be a desktop computer, a laptop computer, a smart phone, a personal digital assistant (PDAs), set-top receiver, automobile media interface, or any other device including computing functionality, user input and output means, and data communication capabilities. A client device 150 is configured to communicate with the SM sources 110, time based media sources 120, advertisers 160, and the affinity server 130 via the network 140.

Advertisers 160 include companies, advertising agencies, or any other third-party organizations that create, distribute, or promote advertisements for SM users through social networks or directly with client devices 150, for example using a web browser. Advertisements include not only individual advertisements (e.g., video ads, banner ads, links or other creatives), but also brands, advertising campaigns, and flights, and targeted advertisements. Advertisements may be published in the social networks alongside other content, posted in websites hosted by web servers (not shown), sent directly to client devices 150, or inserted into time based media sources 120. Advertisements may be stored on servers maintained by the advertisers 160, they may be sent to the affinity server 130 and stored there, they may be sent to the SM sources 110 and stored there, and/or they may be sent to external web servers and stored there. Advertisements may be sent to users by external ad servers (not shown), by web servers, by the SM sources 110, by the advertisers 160, or by the client devices 150. These systems may also work in conjunction to request, create, and send advertisements.

The affinity server 130 estimates the affinity between a first time based media event or topic and a second time based media event or topic. The affinity server 130 is a computer system that includes a web server 200 and associated API 202, as well as a number of components that are described with respect to FIGS. 2-8.

The web server 200 links the server 130 to the network 140 and the other systems described in FIG. 1. The web server 200 serves web pages, as well as other web related content, such as Java, Flash, XML, and so forth. The web server 200 may include a mail server or other messaging functionality for receiving and routing messages between the server 130 and the other systems described in FIG. 1.

The API 202, in conjunction with web server 200, allows one or more external entities to access information from the server 130. The web server 200 may also allow external entities to send information to the server 130 calling the API 202. For example, an external entity sends an API request to the server 130 via the network 140 and the web server 200 receives the API request. The web server 200 processes the request by calling an API 202 associated with the API request to generate an appropriate response, which the web server 200 communicates to the external entity via the network 140. The API may be used by a SM source 110 to communicate information and requests to the server 130.

The affinity server 130 may be implemented using a single computer, or a network of computers, including cloud-based computer implementations. The computers are preferably server class computers including one or more high-performance CPUs, 1G or more of main memory, as well as 500 GB to 2 Tb of computer readable, persistent storage, and running an operating system such as LINUX or variants thereof. The operations of the server 130 as described can be controlled through either hardware or through computer programs installed in computer storage and executed by the processors of such servers to perform the functions described herein. The server 130 includes other hardware elements necessary for the operations described here, including network interfaces and protocols, security systems, input devices for data entry, and output devices for display, printing, or other presentations of data; these and other conventional components are not shown so as to not obscure the relevant details.

As noted above, server 130 comprises a number of "engines" an "aggregator" and an "estimator" each of which refer to computational logic for providing the specified functionality. An engine can be implemented in hardware, firmware, and/or software. An engine, aggregator, or estimator may sometimes be equivalently referred to as a "module," "system", or a "server." It will be understood that the named components represent one embodiment of the present invention, and other embodiments may include other components. In addition, other embodiments may lack the components described herein and/or distribute the described functionality among the components in a different manner. Additionally, the functionalities attributed to more than one component can be incorporated into a single component. Where the engines described herein are implemented as software, the engine can be implemented as a standalone program, but can also be implemented through other means, for example as part of a larger program, as a plurality of separate programs, or as one or more statically or dynamically linked libraries. In any of these software implementations, the engines are stored on the computer readable persistent storage devices of the server 130, loaded into memory, and executed by the one or more processors of the system's computers. The operations of the server 130 and its various components will be further described below with respect to the remaining figures. As will become apparent, the various data processing operations described herein are sufficiently complex and time consuming as to require the operation of a computer system such as the server 130, and cannot be performed merely in the human mind by mental steps.

II. Affinity Score Generation Overview

Figure 2:
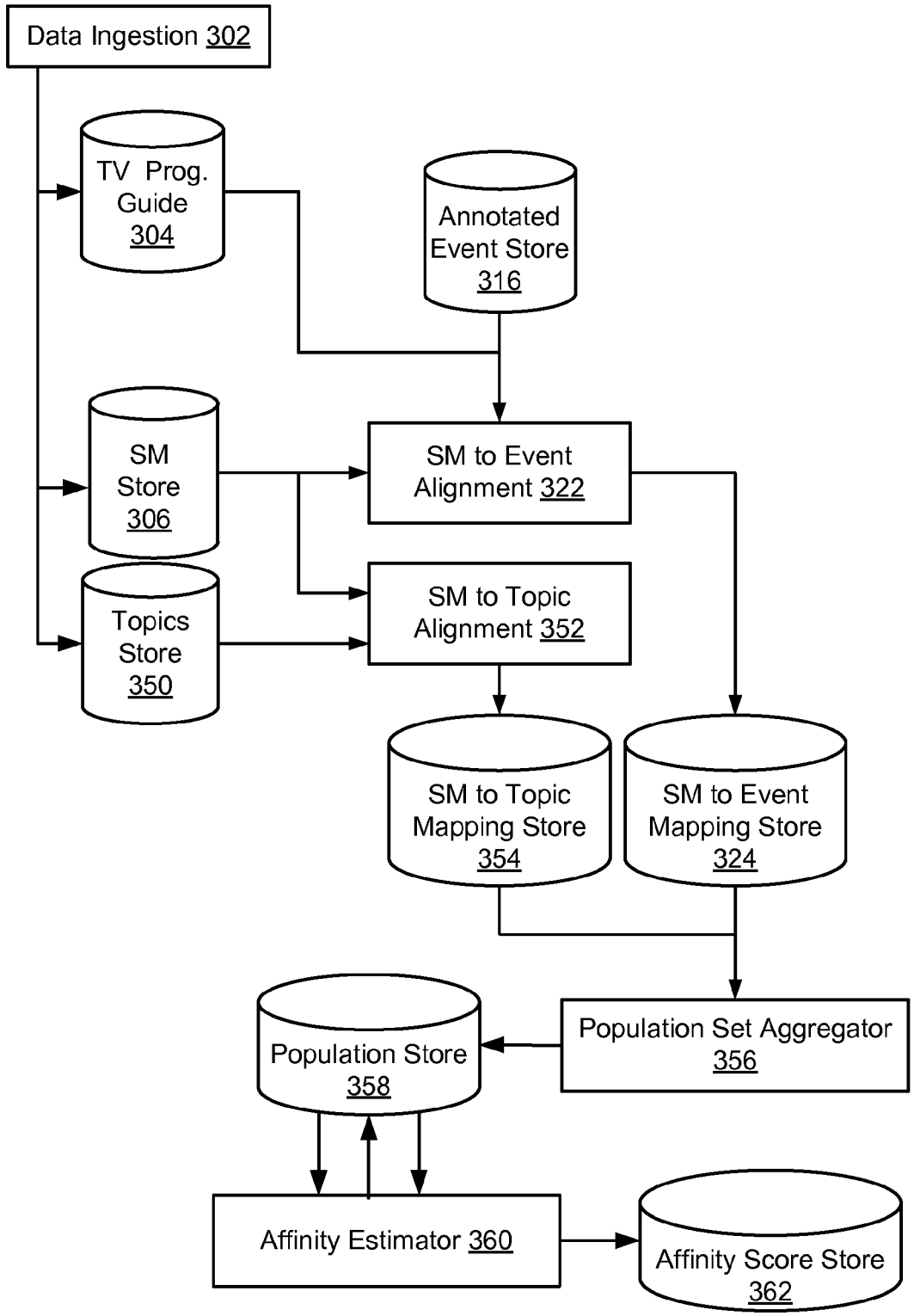
FIG. 2 is a block diagram and flowchart of an alignment and affinity estimation process at a high level according to one embodiment.

FIG. 2 is a block diagram of the affinity server 130 and flowchart for the generation of an affinity score, according to one embodiment. The affinity server 130 includes a data ingest 302, an event airing detection 314 system, an annotated event store (or repository) 316, a TV programming guide store 304, a SM to event alignment 322 engine, a SM store 306, a SM to event mapping store 324, a SM to topic alignment 352 engine, a topic store 350, a SM to topic mapping store 354, a population set aggregator 356, a population store 358, an affinity estimator 360, and an affinity score store 362.

Data ingest 302 accesses and stores a number of different items of information for the affinity server 130. Data ingest 302 receives SM content items from social media sources 110. Data ingest 302 also receives metadata related to SM content items including, for example, identification information for the SM user who authored each SM content item, SM profile information (including SM user contact information such as a user name in a social network, mobile number, email address or the like), social graph information, and the history of the content items each SM user has produced. This data is stored in SM store 306.

Data ingest 302 also receives TV electronic programming guide data ("EPG data") from an external source such as time based media sources 120. The TV programming guide data may be in the form of a data feed, for example. The TV programming guide data provides metadata information as to where (e.g., channel, geographic region) and when specific TV shows are aired, and also provides information about those shows (e.g. cast, characters, episode descriptions, etc.). Programming guide data is received from broadcast and cable networks, multiple system operators, or third party services. This data is stored in TV programming guide store 304.

Data ingest 302 may also receive streams of time based media from the time based media sources 120, including for example, streams of TV shows and radio broadcasts. The time based media is received from, for example, network broadcast, cable or satellite providers. The time based media may include metadata that is transmitted along with the streams. The streams and any associated metadata may be processed to generate annotated events 316 that may be used in addition to or in place of the TV programming guide data.

Data ingest 302 may also receive topics from external third parties. Additionally, the affinity server 130 may also create topics on its own. Topics are stored in topic store 350. Topics are described below with respect to FIG. 5.

The affinity server 130 uses the ingested data to estimate an affinity score between two different time based media events (e.g., TV, radio, internet content stream), between a time based media event and a specific topic, or between two different topics. To do this, the SM to event alignment 322 engine aligns (or "maps") the SM content items and their authors (i.e., SM users) with the TV programming guide data and/or annotated events 316. The alignments indicate which SM content items are relevant to which events. Since each SM content item has an SM user as an author, it follows that the mappings also indicate which SM users are relevant to which events. These mappings are stored in mapping store 324. SM to event alignment 322 is described below with respect to FIG. 4.

Separately, the SM to topic alignment 352 engine maps the SM content items and their authors with the topics. The mappings indicate which SM content items (and their authors) are relevant to which topics. These mappings are stored in SM to topic mapping store 354. SM to topic alignment 352 is described below with respect to FIG. 5.

To generate an affinity score, the affinity server 130 receives, at least, a first time based media event or topic and second time based media event or topic for which an affinity score is to be determined. The selected events and/or topics may be received externally, for example from a user (e.g., an advertiser 160) providing input through a web user interface, such as the one displayed in FIGS. 6-8 described below.

A population set aggregator 356 selects SM users from the SM to topic mapping store 354 and SM to event mapping store 324 to create two populations. A first population includes those SM users who are aligned with the first time based media event or topic. Thus, the first population represents those SM users who are determined to have an interest in the first time based media or topic based on their authorship of SM content relevant to that time based media event or topic. A second population includes those SM users who are aligned with the second time based media event or topic. These populations are stored in the population store 358. Each population may be filtered using one or more filtering criteria. The population set aggregator 356 is described below.

An affinity estimator 350 determines an affinity score based on the intersection between the first and second populations. The affinity score may be normalized by a number of different factors including, for example, the sizes of each of the two populations and/or the relationship between the intersection and the other populations in the repository. The affinity score is stored in store 362. The affinity estimator 360 is described below.

III. Relationship between EPG Data, Annotated Events, and SM Content Items

Figure 3:
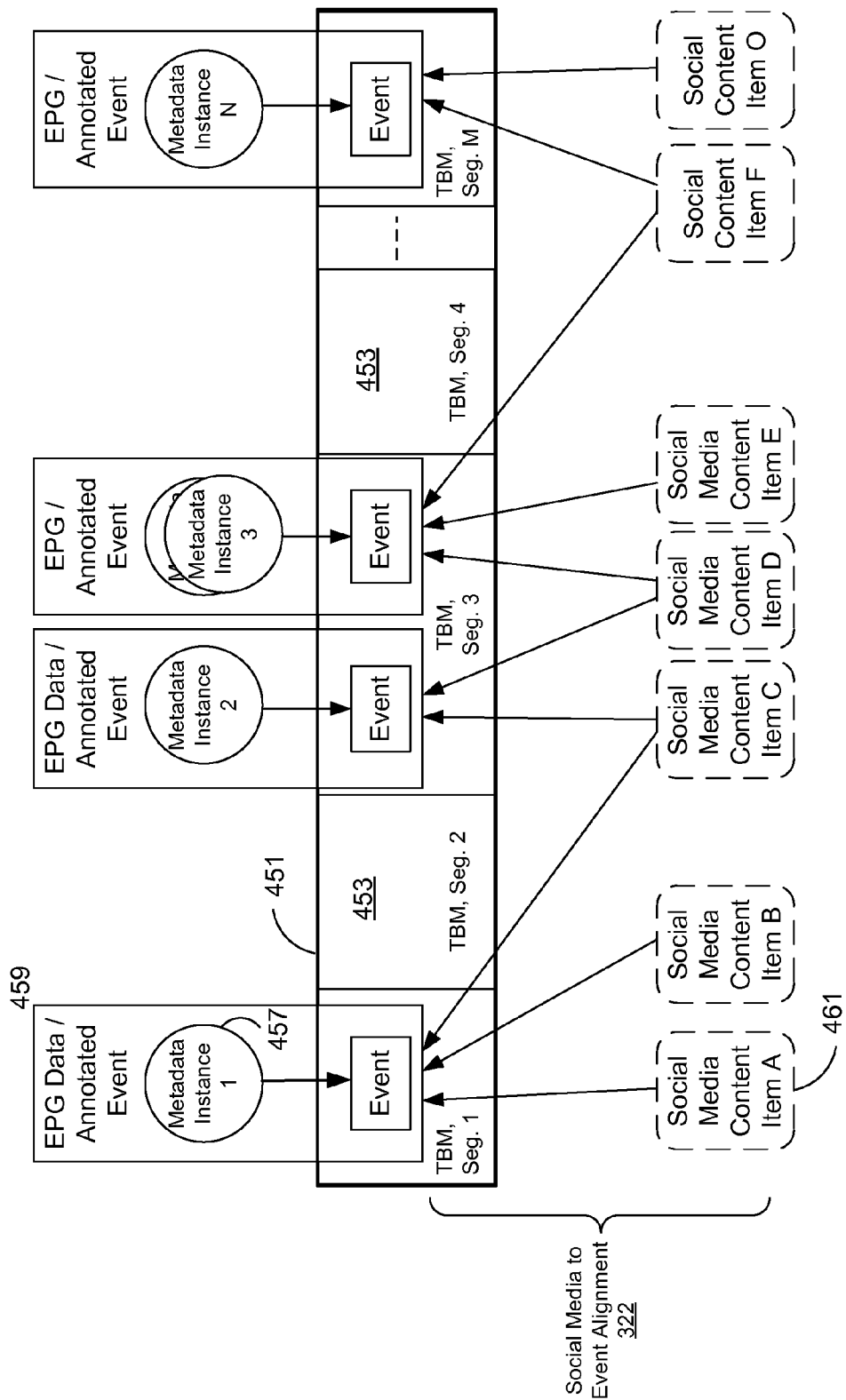
FIG. 3 is a conceptual diagram illustrating the relationship between time based media events, TV programming guide data and annotated events, and the alignments created between events and SM content items.

FIG. 3 is a conceptual diagram illustrating the relationship between time based media events, TV programming guide data and annotated events, and the alignments 322 created between events and SM content items. As shown, time based media 451 includes multiple segments (segs. 1-M) 453, which contain events in the time based media. Both TV programming guide data 359 and annotated events 359 each include a reference to one of the events and one or more metadata instances 457 (1-N).

Metadata instances 457 can include, but are not limited to: the type of event occurring (e.g., TV show, advertisement), if the event is an advertisement, the brand or product being advertised, the agents actors/characters involved in the event, the scene/location of the event, the time of occurrence and time length of the event, the results/causes of the event, etc. For example, metadata for an advertisement type event may include information such as "Brand: Walmart; Scene: father dresses up as clown; Mood: comic." As illustrated in these examples, the metadata can be structured as tuples of <name, value> pairs.

Metadata instances 457 may also include low level features for an event, e.g., image or audio features or content features, hand annotations with text descriptions, or both. Metadata may be represented as text descriptions of time based media events and as feature vector representations of audio and/or video content extracted from examples of events. Examples of such metadata include a number and length of each shot, histograms of each shot (e.g., color, texture, edges, gradients, brightness, etc.), and spectral information (e.g., frequency coefficients, energy levels) of the associated audio. Metadata may be generated using human annotation (e.g., via human annotators watching events or samples thereof) and may be supplemented with automatic annotations. Metadata may also include different types of features including but not limited to scale-variant feature transform (SIFT), speeded up robust features (SURF), local energy based shape histogram (LESH), color histogram, and gradient location orientation histogram (GLOH).

Annotated events 459 are aligned to one or more SM content items 461 (A-O), using alignment process 322 as further described in conjunction with FIG. 4 below. Note that alignment processes 322, alignments may be one-to-one, many-to-one, and/or many-to-many. Thus, a given SM content item 461 can be mapped to multiple different annotated events 459 (e.g., SM content items C, D, and F), and an annotated event 459 can be mapped to multiple different SM content items 461.

IV. Social Media to Event Alignment

Figure 4:
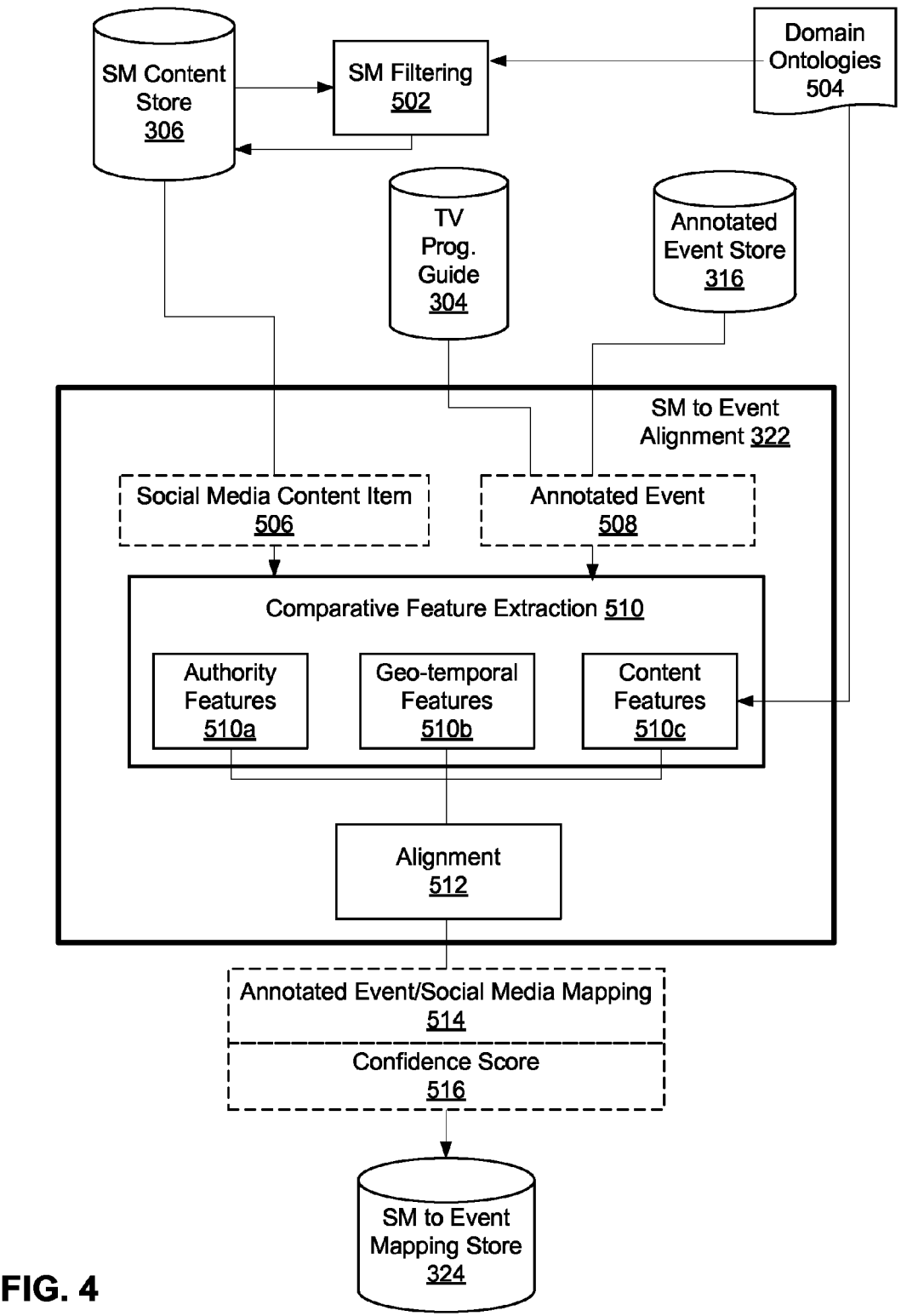
FIG. 4 is a block diagram and flowchart illustrating one embodiment of social media to event alignment.

FIG. 4 is a block diagram and flowchart illustrating one embodiment of SM to event alignment 322. The alignments indicate which SM content items are relevant to which events. The annotated events are drawn from the TV programming guide data 304 as well as from annotated event store 316.

IV.A. Filtering

In one embodiment SM filtering 502 is performed prior to SM to event alignment 322. SM content items are filtered 502 in order to create a set of candidate content items with a high likelihood that they are relevant to a specific event. For example, content items can be relevant to an event if they include a reference to the event. To perform filtering 502, a candidate set of content items is compiled based on the likelihood that those content items are relevant to the events, for example, by including at least one reference to a specific event. A comparative feature extraction engine 510 is one mechanism for doing this, and is described with respect to SM to event alignment 322.

At the simplest, this candidate set of content items can be the result of filtering 502 associated with a given time frame of the event in question. Temporal filters often are, however, far too general, as many content items will only coincidentally co-occur in time with a given event. In addition, for broadcast TV, e.g., the increasing use of digital video recorders has broadened significantly the relevant timeframe for events.

Additional filters 502 are applied based on terms used in the content item's text content (e.g., actual texts or extracted text from closed caption or audio) that appear in the metadata for an event. Additional filters may also include domain specific terms from domain ontologies 504. For example, content item of a social network posting of "Touchdown Brady! Go Patriots" has a high probability that it refers to an event in a Patriots football game due to the use of the player name, team name, and play name, and this content item would be relevant to the event. In another example, a content item of a post "I love that Walmart commercial" has a high probability that it refers to an advertisement event for Walmart due to the use of the store name, and the term "commercial," and thus would likewise be relevant to this event.

A SM content item can be relevant to an event without necessarily including a direct textual reference to the event. Various information retrieval and scoring methods can be applied to the content items to determine relevancy, based on set-theoretic (e.g., Boolean search), algebraic (e.g., vector space models, neural networks, latent semantic analysis), or probabilistic models (e.g., binary independence, or language models), and the like.

SM content items that do not pass certain of these initial filters, e.g., temporal or content filters, are removed from further processing, reducing the number of mappings that occur in the latter steps. The output of SM filtering 502 is an updated SM content store 306, which indicates, for each content item, whether that content item was filtered by temporal or content filters. Additional filters may apply in additional domains.

IV.B. Social Media to Event Alignment

SM to annotated event alignment 322 includes a comparative feature extraction 510 and an alignment function 512. The comparative feature extraction 510 converts input of an annotated event 508 (and/or events stored in the TV programming guide data 304) and a SM content item 506 into a feature vector representation, which is then input to the alignment function 512. The alignment function uses the received features to create a relationship between the event features and SM features. The relationship may be co-occurrence, correlation, or other relationships as described herein. The comparative feature extraction 510 also may receive input from the SM author store 308 and the domain ontologies 504. The three major types of features extracted are content features 510c, geo-temporal features 510b, and authority features 510a.

Content features 510*c* refer to co-occurring information within the content of the SM content items and the metadata for the video events, e.g., terms that exist both in the content item and in the metadata for the video event. Domain ontologies 504 may be used to expand the set of terms used when generating content features. In addition to exact matches, the domain ontologies 504 that encode information relevant the TV show and/or advertising domain may be used to expand the term set to include synonyms and hypernyms (e.g., "hilarious" for "comic"), names of companies, products, stores, etc., as well as TV show associated words (e.g., "episode") and advertisement associated words (e.g., "commercial").

Geo-temporal features 510*b* refer to the difference in location (e.g., geographic region of airing) and time at which the input media was generated from a location associated with the SM content item about the event. Such information is useful as the relevance of SM to an event is often inversely correlated with the distance from the event (in time and space) that the media was produced. In other words, SM relevant to an event is often produced during or soon after that event, and sometimes by people at or near the event (e.g., a sporting event) or exposed to it (e.g., within broadcast area for TV-based event).

For video events, geo-temporal information can be determined based on the location and/or time zone of the event or broadcast of the event, the time it started, the offset in the video that the start of the event is determined, the channel on which it was broadcast. For SM, geo-temporal information can be part of the content of the media itself (e.g., a time stamp on a blog entry or status update) or as metadata of the media or its author.

The temporal features describe the difference in time between when the SM content item was created from the time that the event itself took place. In general, smaller differences in time of production are indicative of more confident alignments. Such differences can be passed through a sigmoid function such that as the difference in time increases, the probability of alignment decreases, but plateaus at a certain point. The parameters of this function may be tuned based on an annotated verification data set. The spatial features describe the distance from the author of the content item location relative to the geographical area of the event or broadcast. Spatial differences are less indicative because often times people comment on events that take place far from their location. A sigmoid function may be used to model this relationship as well, although parameters are tuned based on different held out data.

Authority features 510*a* describe information related to the author of the SM and help to increase the confidence that a SM content item refers to a video event. The probability that any ambiguous post refers to a particular event is dependent upon the prior probability that the author would post about a similar type of event (e.g., a basketball game for an author who has posted content about prior basketball games). The prior probability can be approximated based on a number of features including: the author's self-generated user profile (e.g., mentions of a brand, team, etc.), the author's previous content items (e.g., about similar or related events), and the author's friends (e.g., their content contributions, profiles, etc.). These prior probability features may be used as features for the mapping function.

The alignment function 512 takes the set of extracted features 510*a-c* and outputs a mapping 514 and a confidence score 516 representing the confidence that the SM content item refers (or references) to the video event. For each feature type 510*a-c*, a feature specific sub-function generates a score indicating whether the SM content item refers to the annotated event. Each sub-function's score is based only on the information extracted in that particular feature set. The scores for each sub-function may then be combined using a weighted sum, in order to output a mapping 514 and an associated confidence score 516, as shown below for an event x and a SM content item y:

$$\text{align}(\text{feat}(x,y))=[\alpha\cdot\text{content}(\text{feat}(x,y))]+[\beta\cdot\text{geoTemp}(\text{feat}(x,y))]+[\gamma\cdot\text{author}(\text{feat}(x,y))]$$

where $\alpha$, $\beta$, and $\gamma$ are the respective weights applied to the three feature types, and align(feat(x,y)) is the confidence score. Both the weights in the weighted sum, as well as the sub-functions themselves may be trained using supervised learning methods, or optimized by hand.

The output of the SM to event alignment 332 is a mapping between an annotated event and a SM content item. The mapping includes the confidence score that has been determined between the annotated event and the SM content item. In one embodiment, the SM content item is considered relevant to the annotated event if the confidence score exceeds a threshold. This mapping, along with the real-value confidence score is stored in the mapping store 324.

IV.C. Social Media to Event Alignment Example

For example, a SM content item may say "I loved this GLEE episode. Can you believe what Quinn just did." The metadata for the TV show "GLEE" may include: {"Show: GLEE; Cast: Dianne Agron, Chris Colfer, etc.; Characters: Quinn, Kurt, etc.; Description: In this episode . . . "}. In this example, the SM content item and the event metadata have co-occurring (e.g., matching) content terms (e,g, "GLEE" and "Quinn"). In another example, the SM content item "I loved that hilarious Walmart clown commercial" and the metadata for an advertisement for Walmart {"Brand: Walmart, Scene: father dresses up as clown, Mood: comic"} have co-occurring content terms (e.g., "Walmart" and "clown"). The matches may be considered generally, so that content appearing anywhere in a SM message can be matched against any terms or elements of the TV show or advertisement metadata, or may be restricted to certain sub-parts thereof.

IV.D. Social Media User Alignment

The mappings 324 between SM content items and events may be translated into alignments between SM users and events. This alignment represents a conclusion that the SM user has an interest in the event based on their authoring of a SM content item that has been determined to be relevant to the event. The alignments between SM users and events may vary depending upon the implementation.

In one embodiment, if at least one SM content item has been determined to be relevant to an event based on the confidence score, then the SM user is aligned with the event. In other embodiments, the SM user is aligned with the event when the SM user has authored a threshold number of SM content items determined to be relevant to the event.

In another embodiment, a total confidence score may be determined that represents the confidence that an event is relevant (i.e., of interest) to a SM user. The total confidence score may be determined using a weighting function that takes into account the confidence scores, with respect to the event, of some or all of the SM content items authored by the SM user. For example, the function may sum these individual confidence scores. If the total confidence score exceeds a threshold, the SM user is aligned with the event.

V. Social Media to Topic Alignment

Figure 5:
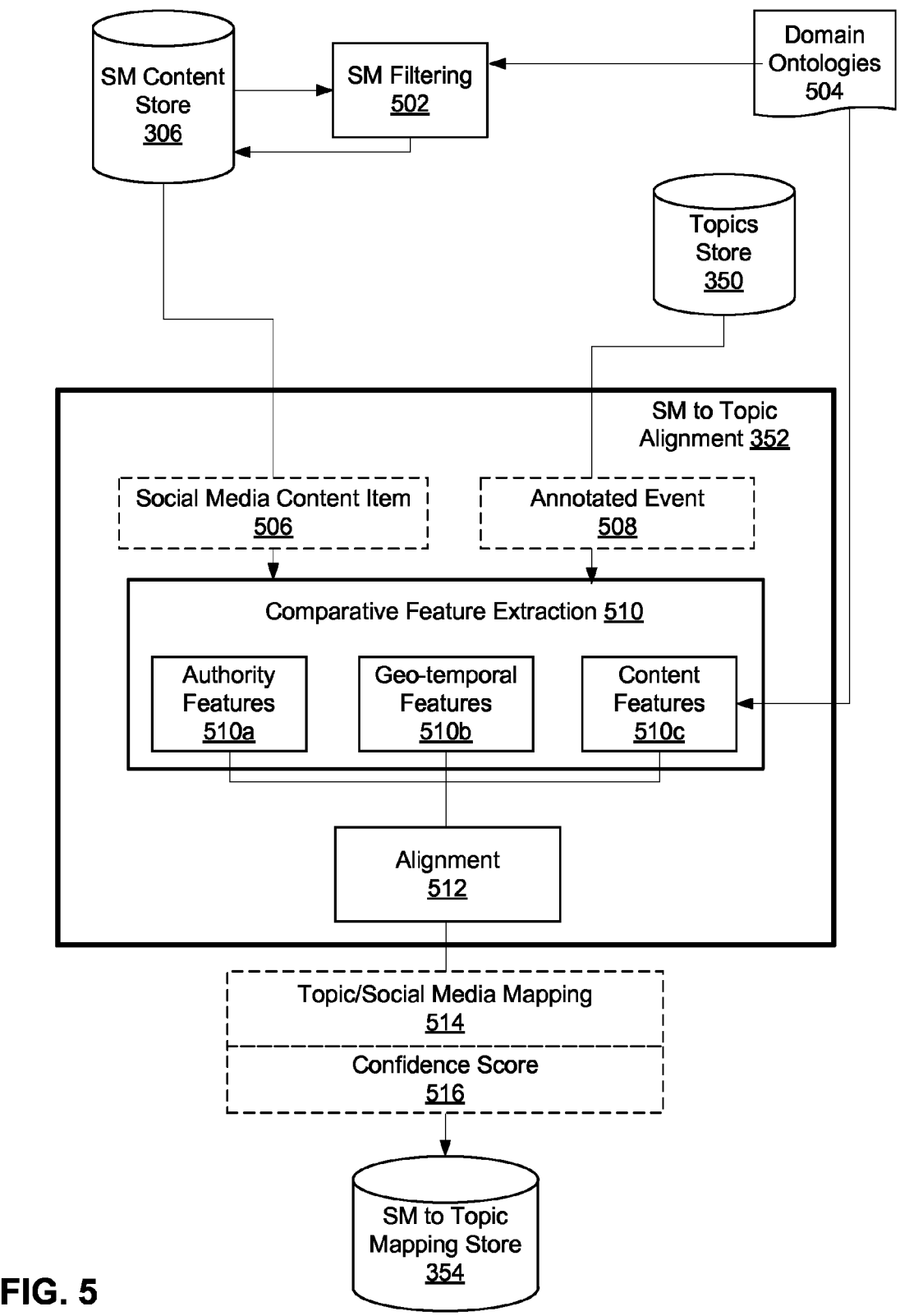
FIG. 5 is a block diagram and flowchart illustrating one embodiment of social media to topic alignment.

FIG. 5 is a block diagram and flowchart illustrating one embodiment of SM to topic alignment 352. The SM to topic alignment process 352 is similar to the SM to event alignment process 322 described in FIG. 4. Thus, the description of the SM to topic alignment process 352 does not repeat all of the details of this process. SM to topic alignment 352 determines which SM content items, and also SM users, are relevant to a topic.

A topic is any concept, abstract or physically existing in the real world, that can be described by words. Categories of topics include both expressly acknowledged interests of social media users (e.g., sports, movies, particular brands, musicians, current events, politics, etc.), as well as observed lifestyle patterns and demographics of SM users (e.g., video game players, users within a particular age range, coffee drinkers, museum goers). Topics can be created around individual people (e.g., actors or musicians), groups of people (e.g., bands or sports teams), products and brands (e.g., iPhone or Cadillacs), works of art (e.g., movies, books or songs), lifestyle segments (e.g. parents, technology enthusiasts), or any other concept that can be referred to in social media.

Topics may be general in nature (e.g., the "candy" topic) or more specific (e.g., "HERSHEY'S" brand chocolate vs. "CADBURY" brand chocolate). For example, HERSHEY'S may want to launch an advertising campaign to target users who have an affinity for their brand, and thus, a "brand topic" could be created to identify authors publishing social media content item related to the HERSHEY'S brand. Similarly, a brand topic could be created for a competitor brand (e.g., CADBURY) in order to enable identification of SM users with an affinity for HERSHEY'S's competitors.

Topics are stored in topic store 350. Topics may be created by the affinity server 130. Topics may also be provided by the advertiser 160. In one implementation, each topic is associated with one or more keywords. These keywords may include Boolean expressions for determining whether some other item of information, for example a SM content item, matches the topic. Topics may also be associated with domain ontologies that expand the set of keywords to be matched against a topic based on semantic similarity. Additionally, statistical machine learning can be used to train classifiers to be associated with various topics. These classifiers may be used to predict the confidence that another item, for example, a SM content item, matches the topic.

The affinity server 130 performs the SM to topic alignment process 352 using the keywords and/or classifiers associated with a topic. Comparative feature extraction 510 is performed on a SM content item. The extracted features are matched (or aligned) 512 with the classifiers or keywords associated with a topic to identify if the SM content item is relevant to a topic. As a result of the matching 512, a confidence score 516 is determined regarding the alignment between the one or more keywords or classifiers and the SM content item. The confidence score 516 represents the confidence that the SM content is relevant to the topic based on the extent of the matching between the keywords and/or classifiers and the extracted features of the SM content item. If the confidence score is sufficiently high, a mapping 514 is created between the topic and the SM content item. This mapping 514, along with the real-value confidence score 516 is stored in the mapping store 354.

The mappings 354 between SM content items and events may be translated into alignments between SM users and topics. The manner in which it is determined whether the SM user is aligned with a topic may vary depending upon the implementation. In one embodiment, if at least one SM content item has been determined to be relevant to a topic, then the SM user is aligned with the topic. This alignment represents a conclusion that the SM user has an interest in the topic based on their authoring of a SM content item that has been determined to be relevant to the topic.

In another embodiment, a total confidence score may be determined that represents the confidence that a topic is relevant (i.e., of interest) to a SM user. The total confidence score may be determined using a function that takes into account the confidence scores, with respect to the topic, of some or all of the SM content items authored by the SM user. For example, the function may sum these individual confidence scores. If the total confidence score exceeds a threshold, the SM user is aligned with the topic.

For example, if an advertiser 160 wants to determine whether a user is a pet owner (as one example of a lifestyle topic), the affinity server 130 determines whether the user is a pet owner by using keywords/phrases that when used by an author, are indicative of being a pet owner. These keywords/phrases might include, for example, "my dog", "my cat", "my kitten", "our dog", "our puppy", and so on. The SM content items authored by a given SM user may contain an example SM content item stating "My dog slobbered all over the couch!". Comparative feature extraction 510 extracts several features from this content item, including at least one (e.g., "my dog") that matches the keywords associated with the pet owner topic. Consequently, alignment 512 may determine that there is a high level of confidence (e.g., a high confidence score) that the SM content item is associated with the topic of being a pet owner. Based on this and other SM content items authored by the SM user, the SM user is aligned with the pet owner topic.

VI. Time Based Media Audience Affinity Estimation

With reference to FIG. 2, the affinity server 130 is configured to determine an affinity score representing the intersection between social media users who have expressed interest in a first topic or time based media event and social media users who have expressed interest in a second topic or time based media event. As described above, the affinity server 130 includes a population set aggregator 356, a population store 358, an affinity estimator 360, and an affinity score store 362.

The affinity server 130 is configured to generate an affinity score between a first topic or event and a second topic event. The events and/or topics may be received externally, for example from a user (e.g., an advertiser 160) providing input through a web user interface, such as the one displayed in FIGS. 6-8 described below. The population set aggregator 356 is configured to aggregate a first population for the first topic or event, and to aggregate a second population for the second topic or event. The affinity estimator 360 determines the affinity score using at least the first and second populations.

VI.A. Population Aggregation and Filtering

The population set aggregator 356 aggregates a population of SM users who are aligned with a topic or time based media event. The population set aggregator 356 draws from the SM to topic mapping store 354 and the SM to event mapping store 324.

The population set aggregator 356 is configured to form a population based on a list of SM users who are aligned with a topic or event. The SM users in a population may be identified both directly (e.g., by a SM user profile name) or parametrically (e.g., by attributes listed in a SM user profile), or by a combination thereof. In one implementation, if an SM user is aligned with the event or topic, they are included in the population.

The population set aggregator 356 is also configured to aggregate populations based on metadata associated with events. For example, users aligned to multiple TV shows can be aggregated into a single population based on the networks on which the shows air, the time of day the show airs, the genre of the show, the actors in the show, etc. Such aggregations allow for affinity scores to be calculated between, for example, brands or products, TV network names, lifestyle topics, genres, particular TV shows and TV dayparts, etc.

The population set aggregator 356 is also configured to filter a population according to one or more criteria in order to refine the list of SM users who make up the population. Population filtering allows for the determination of an affinity score with respect to a more specific criteria. This improves the ability of the affinity server 130 to provide more specific information to advertisers, who may in turn uses this information to specifically target their advertising efforts.

Criteria for filtering include, for example, filtering social media users based on social media user demographic information, the content of authored SM content items, or time of authorship of SM content items. The population set aggregator 356 is configured to combine multiple different filtering criteria when filtering a population. For example, in order to optimize an advertising campaign, an advertiser may choose to filter a population to include only those SM users that are classified as female in the age ranges of 30-45.

Demographic filtering criteria may include filtering the population to include only those SM users who match an age, gender, socioeconomic data, or geographical location criteria. Demographic filtering criteria may also be based on affiliations of users with groups formed with social media or social networking systems. For example, SM user's membership in a fan club for a band or TV show may be used as a filtering criteria.

A content filtering criteria may specify that only those SM users who have authored SM content items that mention one or more specific keywords or their variants are included in a population. A content filtering criteria may also specify that only those SM users who have authored SM content items expressing a particular sentiment are included in a population. For example, such a criteria may specify that only those SM users who have referred to a topic or event in a positive sentiment (e.g., expressed opinions that were favorable to the brand) are included in a population.

A time filtering criteria may specify that only those SM users who have authored SM content items regarding the topic or event in a particular time range are included in the population. Such a criteria may, for example, specify that only those SM users who have authored SM content items during the airing of a TV show (or within a specified time period before or after) be included in a population. As another example, the criteria may be more broadly defined to include those users who have authored SM content items at any point during an entire season of a given TV show. In this manner, changes in affinity scores may be tracked between episodes or over the course of seasons.

VI.B. Affinity Estimation

The affinity estimator 360 uses the first and second populations aggregated by the population set aggregator 356 to determine an affinity score between the first topic or event and the second topic or event. To do this, the affinity estimator 360 determines the intersection of SM users between the first population and the second population. The population of intersecting SM users who are in both the first and second populations may be stored as an intersecting population in the population store 358.

The affinity score is a numerical value. The affinity score is a function of the number of SM users in the intersecting population. The greater the intersection, the higher the affinity score. The affinity score is stored in an affinity score store 362.

In one implementation, the affinity score is simply a count of the number of SM users in the intersecting population, i.e., in both the first population (population A) and the second population (population B). In this case, the affinity score may be calculated as:

$$\sum_{a \in Au} (A'_a \times B'_a)$$

In this equation, Au represents the set of all SM users, $A'_a$ represents an indicator function that equals 1 if user a commented on event/topic A, and $B'_a$ represents an indicator function that equals 1 if user a commented on event/topic B. In another implementation, the count may be weighted by how many times each individual SM user in the intersecting population authors a SM content item on either one or both of the first and second topics or events. Such a count weights the affinity score based on how many times SM users have authored SM content items about a topic or event. In this case, the affinity score may be calculated as:

$$\sum_{a \in Au} (A_a \times B_a)$$

In this equation, $A_a$ represents the number of SM content items by user a about event/topic A, and $B_a$ represents the number of SM content items by user a about event/topic B.

In another implementation, the count may be weighted based on each SM user's overall probability of authoring a SM content item on the first and second topic or event. This probability is based on the other SM content items they have authored. In this case, the affinity score can be calculated as:

$$\sum_{a \in Au} \left( \frac{A_a}{C_a} \times \frac{B_a}{C_a} \right)$$

In this equation, $C_a$ represents the total number of SM content items made by user a. Such a count adjusts the weight of each SM user based on how many SM content items they have authored (i.e., how "talkative" they are in the context of the social networking system). In one implementation, more talkative users are weighted less heavily than less talkative users.

In another implementation, the count of the number of users in the intersecting population (or "overlap count") is normalized by the total number of SM users in the first or second population. This normalization produces an affinity score that represents the proportion of each population who are present in the other population. For example, the affinity score may represent the proportion of SM users in the first population present in the second population, or the proportion of SM users in the second population present in the first population. In another implementation, the overlap count is normalized by the number of SM users who have commented on TV shows generally, or by the number of SM users in the social networking system, or by some other aggregate measure of SM user behavior in the social networking system.

Depending upon how the affinity score is normalized, affinity scores not be symmetrical, that is the affinity score of population A with respect to population B can be different from the affinity score for population B with respect to population A. For example, an affinity score may be determined that represents the affinity that viewers of AMERICAN IDOL (first population) have for GLEE. This affinity score may be normalized based on the size of the population of SM users who have authored SM content items regarding AMERICAN IDOL. Another different affinity score may be determined that represents the affinity that viewers of GLEE (second population) have for AMERICAN IDOL. In contrast, this affinity score may be normalized based on the size of the population of SM users who have authored SM content items regarding GLEE. These two affinity scores may be different, and thus are not necessarily symmetric.

In another implementation, the affinity score can be calculated by determining the average probability of a SM user to author SM content items on event/topic A and event/topic B, normalized by the expected probability of any SM user to author SM content items on A and B. This is equivalent to normalizing the weighted overlap count, described above, and then further normalizing that by the product of the probability of any given SM content item by any SM user being about topic/event A and the probability of any given SM content item by any SM user being about topic/event B. These probabilities may be determined by analyzing the contents of all available SM content items, both generally, and about events/topics A and B specifically. Under such a formulation, the affinity score can be calculated as:

$$\frac{\frac{1}{|Au|} \sum_{a \in Au} \left( \frac{A_a}{C_a} \times \frac{B_a}{C_a} \right)}{\frac{A}{C} \times \frac{B}{C}}$$

Where Au represents the set of all SM users, |Au| represents the cardinality of the set Au, A represents the total number of comments about event/topic A and B represents the total number of comments about event/topic B and C represents the total number of comments made by any SM user.

Other normalization processes may be used, such as normalizing by the cardinality of the union of the first and second population, as well as normalizing by the product of the cardinalities of the first and second populations.

As described above, the affinity score is a determination that relies on the expressed (or measured or observed) interests of SM users as provided by their authored SM content items. Affinity scores may also be used to reveal the inferred (or unmeasured, or hidden) interests of SM users that were not expressly made known. In one implementation, individual affinity scores between pairs of events and/or topics can be combined to reveal "inferred" affinity scores between other pairs of events and/or topics.

In one such implementation, affinity scores are inferred using techniques that exploit the correlation amongst the affinity scores between events and/or topics. Many techniques exist for exploiting such correlations. For example, matrix factorization methods, such as Singular Value Decomposition (SVD), can be applied to a matrix of affinity scores. Each row in the matrix represents a different event or topic. The columns list the same events and/or topics as the rows, again with each column representing a different event or topic. Using SVD, this matrix can be decomposed, its eigenvalues thresholded, and then recomposed to form a smoothed matrix in which each cell in the matrix represents the inferred affinity score between the corresponding events/topics. In another implementation, similar results can be achieved using Hierarchical Bayes Models such as Latent Dirichlet Allocation, etc.

For example, using any of the techniques above, explicit affinity scores may be determined between several events and/or topics. Specifically, a first affinity score may be determined between a first population and a third population, a second affinity score may be determined between a second population and a fourth population, and a third affinity score may be determined between the third and fourth populations. Using SVD, Hierarchical Bayes Models, or another similar technique, the inferred affinity score between the first and second populations may be inferred based on the first, second, and third affinity scores previously calculated.

VI.C. Affinity Score Calculation Example

For example, assume a company that advertises on TV, for example HERSHEY'S chocolate company, wants to make better use of their advertising expenditures so that their advertisements air during TV shows whose audiences have affinity for candy. The affinity server 130 may provide HERSHEY's with one or more affinity scores between topics of interest to HERSHEY's and TV shows that have aired.

To determine the affinity score between a TV show and a topic, the affinity server 130 ingests one or more streams of SM content items, and one or more streams of the TV show. The affinity server 130 also receives from HERSHEY's information identifying a particular topic of interest regarding the affinity that they want to target (e.g., the topic of candy). The affinity server 130 may also receive or create keywords associated with that topic (e.g., "chocolate bar", "chewing gum", "dark chocolate"). The affinity server 130 also receives TV programming guide data.

Event airing detection 314 is performed on the received TV show to create annotated events. The SM content items are aligned using the annotated events and information from the TV programming guide data as inputs to SM to event alignment 322. The SM content items are also aligned with the "candy" topic provided by HERSHEY's using the provided keywords. A population set aggregator 356 creates two populations of SM users, a first population of SM users who have been determined to have an affinity for the TV show, and a second population of SM users who have been determined to have an affinity for the "candy" topic. An affinity estimator 360 determines an affinity score between the TV show and the "candy" topic based on the intersection between the first and second populations.

This process may be repeated for multiple TV shows, and the resulting set of affinity scores may be used to rank order TV shows by affinity score. This provides HERSHEY'S with an indication of which TV shows have audiences that have greater affinity for the topic of "candy."

VII. Example Use Cases for Affinity Scores

VII.A. Individual Affinity Scores

Affinity scores are useful individually. For example, a TV content producer may use the affinity score to determine whether the viewers of one of their TV shows also watch another TV show. Similarly, they may use the affinity score to determine whether the viewers of one of their TV shows are interested in a particular topic.

Affinity scores may also be determined between two different topics. For example, an advertiser may want to determine the extent of SM users who are interested in both a particular brand (e.g., HERSHEY's brand chocolate) and a particular personal interest (e.g., movie watching). The affinity score then will represent the intersection in the populations of SM users who interested in both the topic of HERSHEY's brand chocolate and the topic of movie watching.

VII.B. Using an Affinity Score to Find Advertising Targets in SM

Populations of SM users, as defined by the Population Set Aggregator 356, can be used as targets for advertisements delivered through the social networking system. Advertisers may desire to target such populations because they reflect a relevant customer base for their brand. For example, PURINA may desire to target ads at the topic "pet owners" as they are likely purchasers of pet food. Similarly, BMW may want to target ads at fans of the TV show "TOP GEAR", as they are likely automobile enthusiasts. However, such populations may not achieve the reach required by most SM advertising campaigns. Affinity scores provide a mechanism for finding additional target populations attractive to advertisers.

In one implementation, the affinity score may be used by an advertiser to find SM users who might be receptive to advertising by the advertiser. For example, assume an advertiser desires to target SM users who have high affinity to a particular show or topic (e.g. PURINA may desire to target the topic "pet owners," while BMW may want to target the show "TOP GEAR"). The affinity score provides a mechanism by which an advertiser can find additional populations of SM users who may be receptive to the advertiser's advertisements. Multiple affinity scores can be computed between that show or topic and other TV shows in the repository. The advertiser can choose to target advertisements towards SM users associated with those other TV shows that have a high affinity to the original show or topic (e.g., to those TV shows whose affinity scores are above a threshold). Here, the affinity score is used as a metric for estimating whether the two populations that make up the affinity score are sufficiently similar such that advertising determined to be effective with respect to one population is expected to be effective to the other.

VII.C. Using Affinity Scores for Planning TV Ad Placements

Affinity scores are useful for identifying TV shows where brands should advertise. Affinity scores can be used by brands to help define the TV media plans that dictate in what TV shows their ads will air. Also, affinity scores can be used by TV networks, to identify brands that would benefit from advertising in their shows. In either case, a number of affinity scores may be calculated, where each affinity score is determined between a first topic and a varying second TV show. The first topic may be a brand topic associated w/the brand looking to advertise (e.g. PURINA), or it may be a lifestyle topic (e.g. pet owners) representing the interests of a segment of the population the brand is hoping to target. The first topic may also be replaced by a TV Show for which an advertiser wants to find similar shows in which to advertise.

Affinity scores may be determined between topic A and show B, topic A and show C, topic A and show D, topic A and show E, etc. These affinity scores may be compared to determine the relative level of affinity the populations aligned with these different shows (e.g., shows B-E) have with respect to topic A. These shows (again, shows B-E) may be ranked according to their affinity scores and may be used alone or in conjunction with other metrics, to determine in what TV shows a brand should advertise. For example, the higher the affinity score, the more likely the brand would benefit from advertising. The affinity scores may also be used in conjunction with other metrics to determine the price a brand should be willing to pay for such advertising. For example, the higher the affinity score, the more the brand should be willing to pay.

VII.D. Using Affinity Scores for Measuring and Optimizing TV Ad Campaigns

Affinity scores can be used to dynamically optimize TV ad campaigns. For affinity scores between a TV show and a topic related to a TV ad campaign, a number of different affinity scores may be generated where each affinity score varies with respect to TV show. For example, assume HERSHEY'S runs an ad campaign in which a particular ad creative airs heavily on episodes of the show GLEE as well as on episodes of the show THE VOICE. An affinity score may be determined between the TV show GLEE and HERSHEY'S ad creative. Another affinity score may be determined between THE VOICE and HERSHEY'S ad creative. If the affinity score for the ad creative with respect to GLEE is lower than with respect to THE VOICE, the ad creative can be dynamically replaced during the presentation of GLEE with a different ad creative. Similarly, the ad creative can be added or featured more prominently during THE VOICE. This process for dynamically swapping out ad creatives may be managed manually with human oversight, or may be managed programmatically based on a set of rules with access to affinity data through an Application Programming Interface (APIs).

VII.E. Affinity Scores for TV Show Recommendations

The affinity score between each TV show and every other TV show may be compiled into a matrix where each cell represents the affinity between a source show (e.g., GLEE) and a target show (e.g., AMERICAN IDOL). This matrix can be used to automatically make recommendations to SM users for new shows to watch, based on the other shows that the SM user has authored SM content items with respect to. The matrix can also be used by TV networks or advertisers to determine in which shows to place promotions for upcoming programming. For example, a TV network can use the affinity matrix to choose which of their shows to advertise in one of their other shows. This may be accomplished, for example, by ranking potential placement targets (i.e., other TV shows) according to the affinity between the show to be advertised and the other show in which the advertisement will appear. For example, the Fox network can determine where to advertise GLEE by comparing the affinities provided by the matrix between GLEE and Fox's other shows. By placing ads for GLEE in other shows with which GLEE shares high affinity scores, the network can target audiences that are more likely to have an affinity for GLEE and thus optimize their advertising budget.

VII.F. Filtering Populations to Refine Affinity Scores

The affinity scores generated by the affinity server 130 may not provide exactly the output the user wanted. By filtering the population of SM users matching a topic or event as described above, the affinity scores that are generated by the affinity server 130 may be refined to make them more useful. For example, filtering of the populations may be used to determine affinity scores with respect to individual episodes or seasons of a TV show (based on time of authorship of SM content items).

As another example, the population for the topic of "parents" may be filtered using gender criteria (e.g., SM authors who are women) to create a separate population of SM users who are classified as "mothers." Affinity scores may be generated based on the intersection between the population of "mothers" and various TV shows. These affinity scores may be used, for example by a baby food company, to determine which TV shows the baby food company should target their advertising in.

VII.G Using Affinity Scores in Conjunction with Real World Audience Metrics

An affinity score between a first TV show and another TV show or topic can be used in conjunction with an external metric of the real-world audience size for the first TV show to estimate the total number of real world persons who have affinity for the other TV show or topic.

For example, an affinity score may be determined between a TV show and a demographic topic (e.g., SM users who are ages 24 to 30). This affinity score estimates the number of SM users who are both interested in a particular TV show and who are within the age range of 24 to 30. This affinity score may be normalized so as to be represented as a proportion of the total number of SM users who are aligned with the TV show. This proportion may be combined with an external measure of the number of people, in the real world, who have watched the TV show (i.e., are the viewing audience of the TV show) to determine the number of people in the real world who are aged 24-30 who have watched the TV show. This external measure may be provided by an external source, such as NIELSEN. Estimating the size, in the real world, of a particular audience demographic, such as those viewers aged 24-30, is useful in making airing and advertising decisions.

VIII. Displaying Time Based Media Audience Affinity

Figure 6:
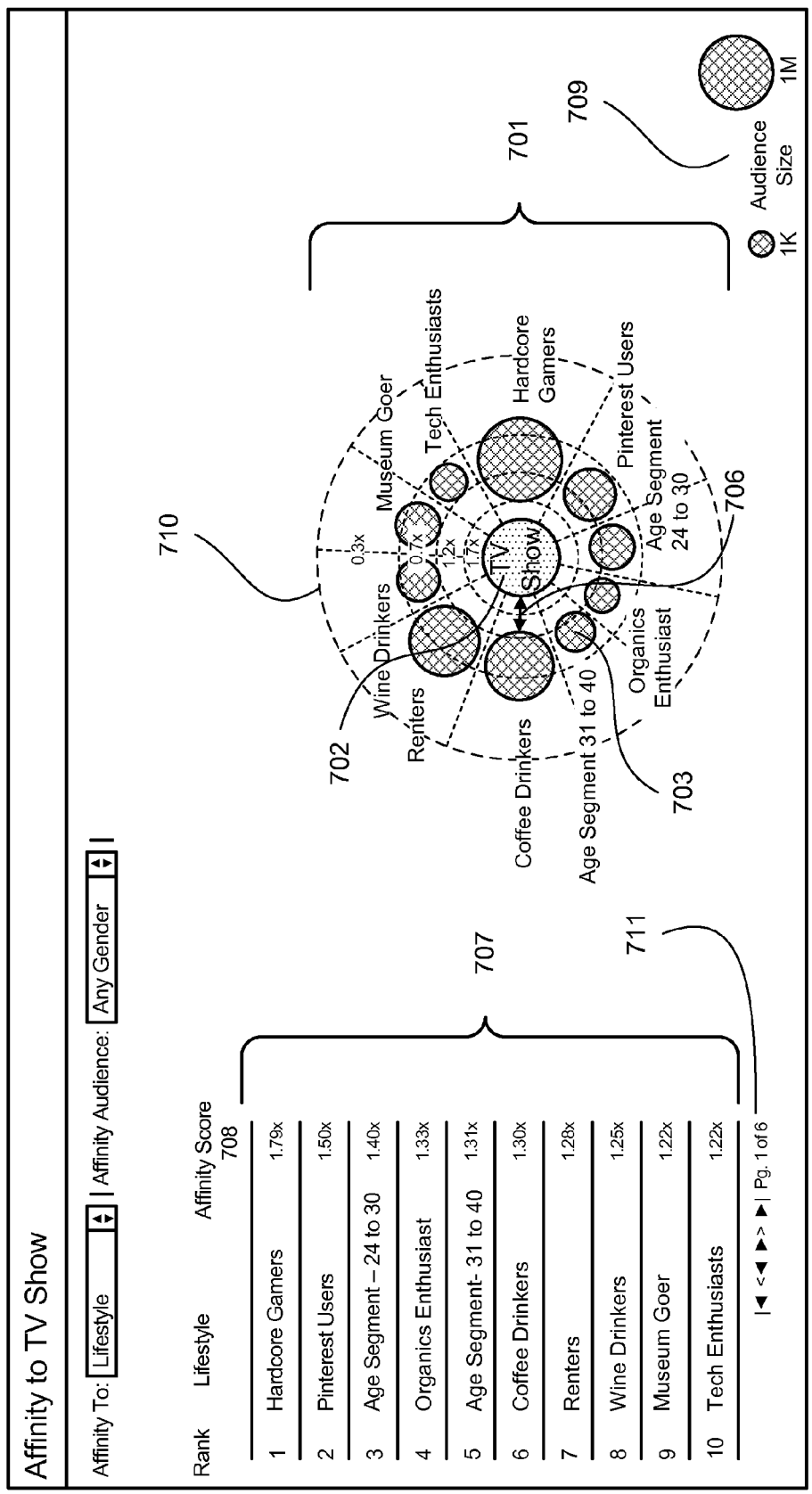
FIG. 6 illustrates one example screenshot of a user interface for displaying affinity scores between a TV show and multiple lifestyle topics of social media users, according to one embodiment.

FIG. 6 illustrates one example screenshot of a user interface for displaying affinity scores between a TV show and multiple lifestyle topics of social media users, according to one embodiment. The user interface is provided by affinity server 130 to a suitable client or display device.

In the example of FIG. 6, the TV show is represented by the circle 702 at the center of a circular shaped graphic 701. The size of the circle 702 is based on the size of the population of SM users for that TV show. Each lifestyle topic is also represented by a circle 703. The size of a circle 703 for a lifestyle topic is based on the size of the population of SM users for that lifestyle topic. A legend 709 provides an indication of how the sizes of circles 702 and 703 correspond to various population sizes. In one implementation, the size of the TV show circle 702 is fixed regardless of the size of the population of SM users for that TV show. Consequently, the legend 709 and sizes of circles 703 have sizes that are relative to the size of the population for the population of viewers of the TV show. Generally, for both circles 702 and 703, the larger the population, the bigger the circle.

The affinity score between the TV show and each lifestyle topic is represented by the distance 706 between the center of TV show circle 702 and the center of lifestyle topic circle 703 (or, alternatively, based on a point on the outer perimeter of either or both of these circles). The larger the affinity score between the TV show and the lifestyle topic, the smaller the distance 706. The circles 703 for the various lifestyle topics for which affinity scores have been calculated are displayed so as radiate circularly around and outward from the TV show circle 702.

A graphical overlay 710 provides an indication of the distances between circles 702 and 703 correspond to numerical affinity scores. In the example of FIG. 6, the graphical overlay includes a series of concentric rings, where each ring is drawn a distance from the outer perimeter of TV show circle 702 so as to represent a specific affinity score. In one implementation, the numerical values for affinity scores are displayed in normalized form, for example, "1.7×," "1.2×", "0.7×", and "0.3×." In example illustrated in FIG. 6, the affinity scores are normalized based on the average affinity score between the TV show and a lifestyle topic. Thus, if a lifestyle topic had an affinity score of "1.7×" to the TV show, then that lifestyle topic has an affinity score that is a multiple of 1.7 times the affinity score of the average lifestyle topic. In the example illustrated in FIG. 6, all of the depicted lifestyle topics and their respective circles 703 have affinity scores above the average (i.e., all have normalized affinity scores greater than 1).

The number and density of the rings may vary between implementations. The distance between rings represents a difference between affinity scores. The distance between rings, and thus difference between affinity scores, may be linear, nonlinear, for example. Alternatively, a ring may be displayed for each of a number of specifically ranked lifestyle topics. For example, a ring may be displayed at a distance corresponding to the affinity score of the lifestyle topic with the highest affinity score, 5th highest affinity score, 10th affinity score, etc.

In addition to graphically illustrating the sizes of populations and affinity scores, the population sizes and affinity scores may also be numerically represented. In the example of FIG. 6, the lifestyle topics are displayed in a ranked list 707, where the lifestyle topics are ranked according to their affinity scores 708 with respect to the TV show. Similarly to the concentric rings of graphical overlay 710, the affinity scores in ranked list 707 are normalized based on the average affinity score between the TV show and a lifestyle topic.

In one implementation, the graphic 701 does not display all of the lifestyle topics for which affinity scores have been calculated. The ranked list 707 allows the user to switch between pages 711 of lifestyle topics to view the affinity scores for those lifestyle topics that are not currently displayed. Responsive to receiving a user input to change the page 711, the ranked list 707 displays the lifestyle topics and their respective affinity scores on that page, according to their rank. The graphic 701 may also be updated to graphically depict the lifestyle topics from that page, along with their respective affinity scores, using circles 703 as described above. Thus, by switching between pages the display is updated to provide both a textual and visual depiction of affinity scores between lifestyle topics and the TV show.

Although illustrated with circular graphics and ranked lists, affinity scores and population sizes may be displayed in other formats as well, for example using pie charts, Venn diagrams, or other illustrative tools.

Figure 7:
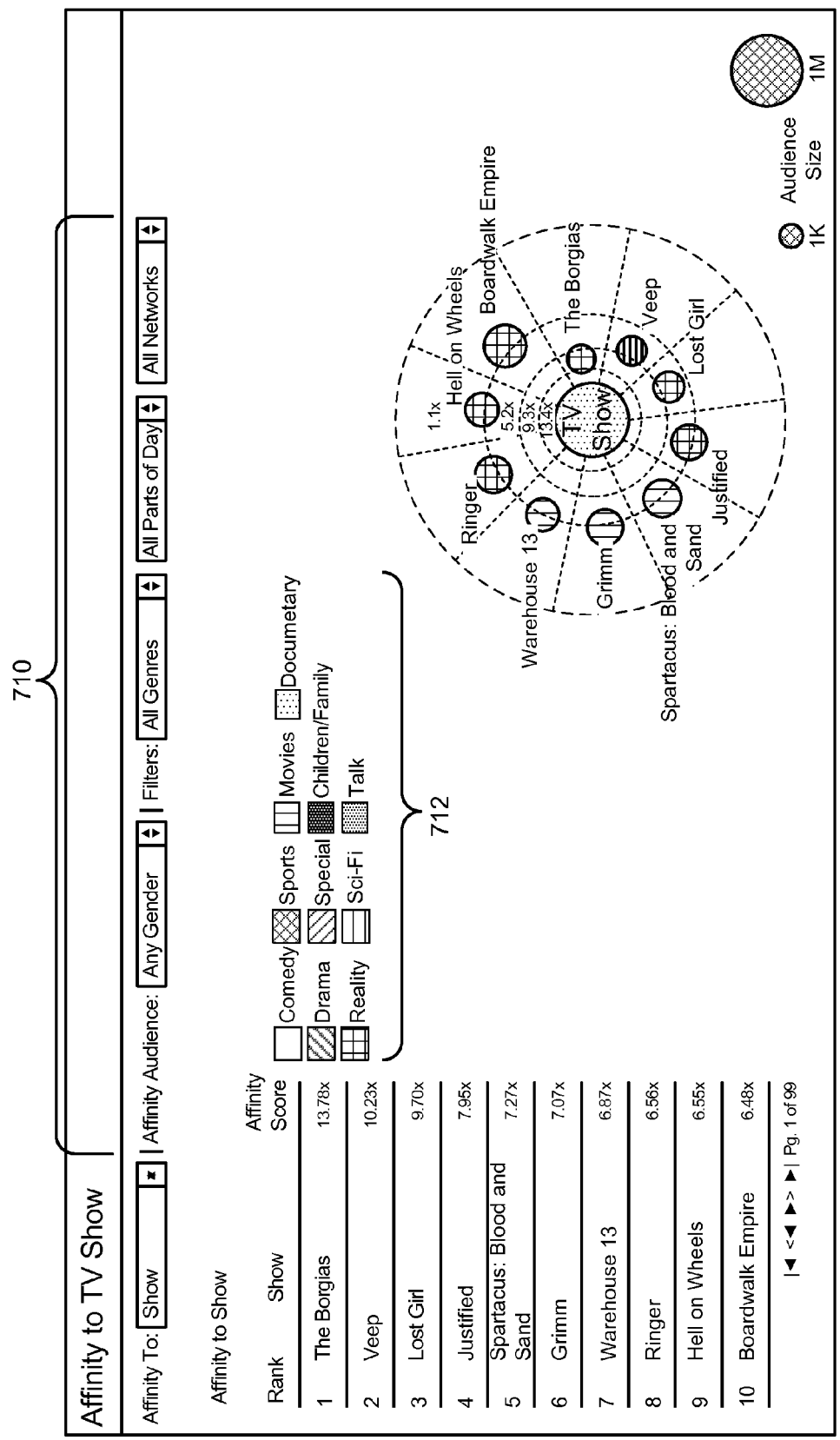
FIG. 7 illustrates one example screenshot of a user interface for displaying affinity scores between a TV show and a number of other TV shows, according to one embodiment.

FIG. 7 illustrates one example screenshot of a user interface for displaying affinity scores between a TV show and a number of other TV shows, according to one embodiment. Affinity scores and population sizes are depicted graphically in the same manner as in FIG. 6 above. The other TV shows for which affinity scores have been calculated are also displayed in a ranked list, again ranked by their respective affinity scores as in FIG. 6.

The user interface also includes filters. In the example illustrated in FIG. 7, the filters are drop down menus 710, however in other implementations the user interface may display radio buttons, check boxes, and/or text boxes to provide filtering options to the user. The filters provided to the user affect how the affinity server 130 generates affinity scores. Specifically, the filters may include options for affecting the SM filtering 502 process as described with respect to FIG. 5 above. The filters may also include options for affecting how the population set aggregator 356 aggregates populations, as described above. Additionally, rather than affecting the generation of affinity scores, the filters provided the user may also affect which TV shows and topic are graphically depicted.

A number of different filters 710 may be provided. A gender filter affects whether affinity scores are calculated for male or female SM users only, versus both together. A genre filter filters the display to only include TV shows or topics matching a selected genre, where the genre to choose from include, for example comedy, drama, sports, etc. 712. A time of day filter filters the display to only include TV shows or topics aired during a certain time of day. Alternatively, the time of day filter may affect the determination of affinity scores by only including in populations those SM users who have authored SM content items during the designated part of day. A network filter filters the display to only include TV shows shown on a particular TV network (e.g., ABC, NBC, CBS).

Once filtering criteria selections have been received from the user, as necessary SM users populations are re-aggregated, affinity scores are re-determined, and the display is updated. Thus, the filters user interface provides a convenient mechanism for the user to determine and refine affinity scores.

The user interface also provides for the color coding 712 of the TV shows or topics. The color coding may be based on information pulled from the TV programming guide data 304, for example.

Figure 8:
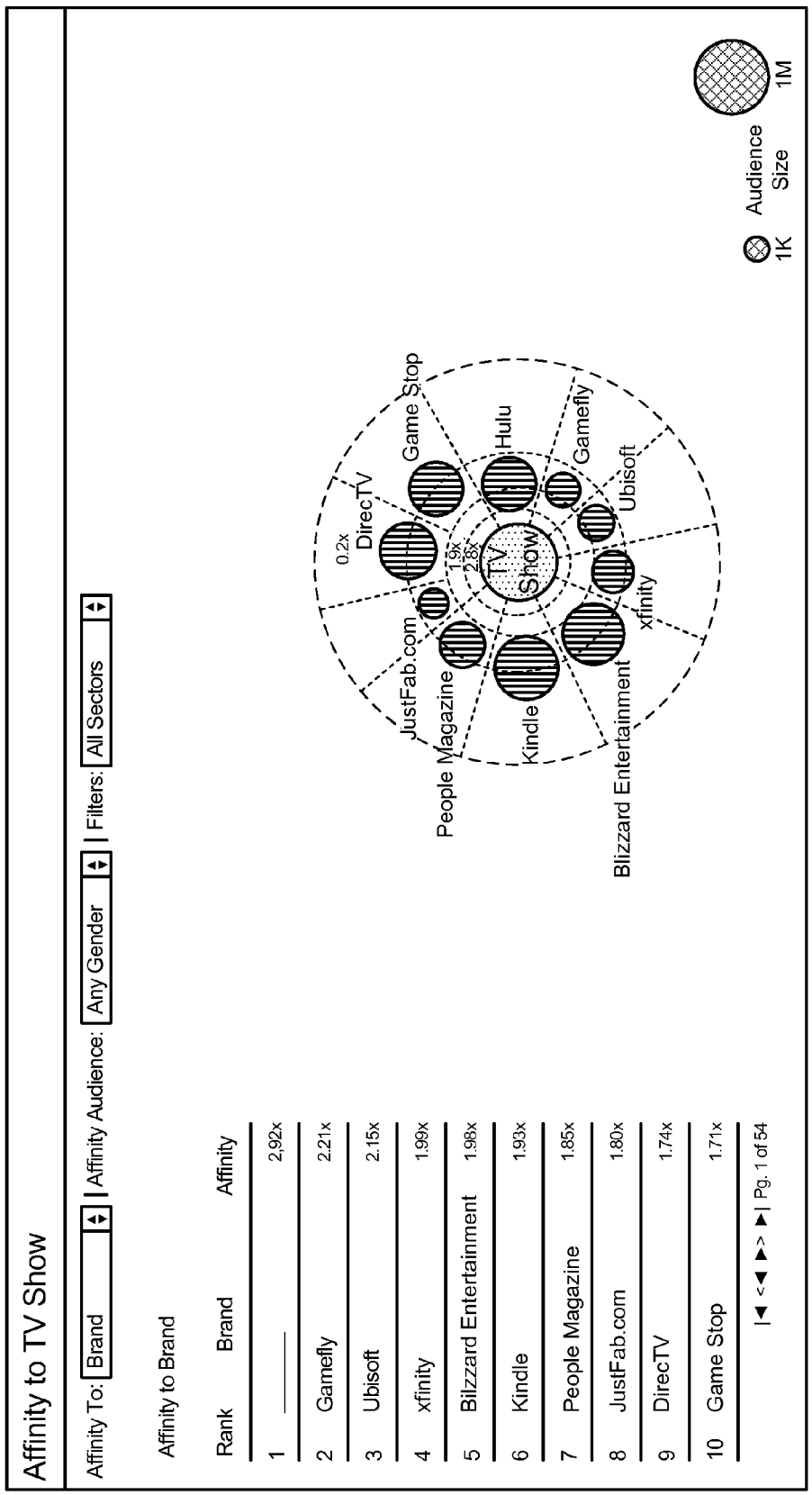
FIG. 8 illustrates one example screenshot of a user interface for displaying affinity scores between a TV show and a number of brand topics, according to one embodiment.

FIG. 8 illustrates one example screenshot of a user interface for displaying affinity scores between a TV show and a number of product brand topics, according to one embodiment. Affinity scores and population sizes are depicted graphically in the same manner as in FIG. 6 above. The brands for which affinity scores have been calculated are also displayed in a ranked list, again ranked by their respective affinity scores as in FIG. 6.

IX. Additional Considerations

Although TV and advertising domains are described above, the methods described herein can be adapted to any domain using time based media (e.g., radio). The method of adaptation is general across different domains. Techniques and features used for event segmentation and annotation are adapted to reflect domain specific characteristics. For example, detecting events in football exploits the visibility of grass as it is represented in the color distributions in a video frame, while detecting events in news video or audio clip may exploit clues in the closed captioning stream.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules or engines, without loss of generality. The described operations and their associated modules or engines may be embodied in software, firmware, hardware, or any combinations thereof.

Any of the steps, operations, or processes described herein may be performed or implemented with one or more hardware or software modules or engines, alone or in combination with other devices. In one embodiment, a software module or engine is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be persistently stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-executed method, comprising:
accessing a plurality of content items authored by users of a social networking system;
accessing a plurality of annotated events of time based broadcast media, the events having been aired during segments of time, the annotated events comprising metadata instances that have semantic information about the events;
generating mappings between the content items and the annotated events, and between the content items and a plurality of topics;
determining a first affinity score between a first population of the users who authored content items mapped to a first one of the events or a first one of the topics and a second population of the users who authored content items mapped to a second one of the events or a second one of the topics;
determining a second affinity score between a third population of the users who authored content items mapped to a third one of the events or a third one of the topics and a fourth population of the users who authored content items mapped to a fourth one of the events or a fourth one of the topics;

determining a third affinity score between the second population and the fourth population; and inferring a fourth affinity score between the first population and third population based on the first, second, and third affinity scores.

2. The computer-executed method of claim 1, wherein generating the mappings comprises performing a feature extraction process on pairs including one of the content items and one of the events or one of the topics, the feature extraction generating content features that identify co-occurring textual information between the content item and the metadata instances of the annotated event or one or more keywords associated with the topic of the pair; and generating scores for the content features indicating whether the content items refers to the annotated events or topics using a feature specific sub-function for the content feature.

3. The computer-executed method of claim 1, further comprising:

accessing programming information regarding the events of time based broadcast media; and annotating the events using an alignment function to estimate the likelihood that the events are described by the metadata instances.

4. The computer-executed method of claim 1, wherein determining one of the affinity scores comprises:

determining an intersecting population of the users between one of the populations mapped to one of the events or topics, and another one of the populations mapped to the one of the events or topics;

determining the affinity score based on the intersecting population.

5. The computer-executed method of claim 4, wherein determining one of the affinity scores comprises calculating a weighted sum over the users in the intersecting population.

6. The computer-executed method of claim 5, wherein a weight is assigned to each user in the intersecting population, and wherein each of the weights is determined based on at least one from the group consisting of:

a number of times the user has authored one of the content items associated with one of the mappings, and a probability that the user will author a content item relevant to either the event or topic associated with one of the populations forming the intersecting population.

7. The computer-executed method of claim 5, wherein determining the affinity score comprises normalizing the weighted sum by an average probability of users to author content items regarding the topics or events associated with intersecting population.

8. The computer-executed method of claim 5, wherein determining the affinity score comprises normalizing the affinity score based on a number of users in the populations forming the intersecting population.

9. The computer-executed method of claim 8, wherein determining the affinity score comprises normalizing the affinity score based on at least one from the group consisting of:

a cardinality of the union between the users of the populations forming the intersecting population and a product of the cardinality between the populations forming the intersecting population.

10. A non-transitory computer-readable storage medium comprising instructions that when executed cause a processor to:

access a plurality of content items authored by users of a social networking system;

access a plurality of annotated events of time based broadcast media, the events having been aired during segments of time, the annotated events comprising metadata instances that have semantic information about the events;

generate mappings between the content items and the annotated events, and between the content items and a plurality of topics;

determine a first affinity score between a first population of the users who authored content items mapped to a first one of the events or a first one of the topics and a second population of the users who authored content items mapped to a second one of the events or a second one of the topics;

determine a second affinity score between a third population of the users who authored content items mapped to a third one of the events or a third one of the topics and a fourth population of the users who authored content items mapped to a fourth one of the events or a fourth one of the topics;

determine a third affinity score between the second population and the fourth population; and infer a fourth affinity score between the first population and third population based on the first, second, and third affinity scores.

11. The medium of claim 10, wherein generating the mappings comprises performing a feature extraction process on pairs including one of the content items and one of the events or one of the topics, the feature extraction generating content features that identify co-occurring textual information between the content item and the metadata instances of the annotated event or one or more keywords associated with the topic of the pair; and generating scores for the content features indicating whether the content items refers to the annotated events or topics using a feature specific sub-function for the content feature.

12. The medium of claim 10, wherein the instructions further cause the processor to:

access programming information regarding the events of time based broadcast media; and annotate the events using an alignment function to estimate the likelihood that the events are described by the metadata instances.

13. The medium of claim 10, wherein determining one of the affinity scores comprises:

determining an intersecting population of the users between one of the populations mapped to one of the events or topics, and another one of the populations mapped to the one of the events or topics;

determining the affinity score based on the intersecting population.

14. The medium of claim 13, wherein determining one of the affinity scores comprises calculating a weighted sum over the users in the intersecting population.

15. The medium of claim 14, wherein a weight is assigned to each user in the intersecting population, and wherein each of the weights is determined based on at least one from the group consisting of:

a number of times the user has authored one of the content items associated with one of the mappings, and a probability that the user will author a content item relevant to either the event or topic associated with one of the populations forming the intersecting population.

16. The medium of claim 14, wherein determining the affinity score comprises normalizing the weighted sum by an average probability of users to author content items regarding the topics or events associated with intersecting population.

17. The medium of claim 14, wherein determining the affinity score comprises normalizing the affinity score based on a number of users in the populations forming the intersecting population.

18. The medium of claim 17, wherein determining the affinity score comprises normalizing the affinity score based on at least one from the group consisting of:
   a cardinality of the union between the users of the populations forming the intersecting population and
   a product of the cardinality between the populations forming the intersecting population.

19. A system comprising:
   a computer server comprising a processor and a database, the computer server configured to:
      access a plurality of content items authored by users of a social networking system;
      access a plurality of annotated events of time based broadcast media, the events having been aired during segments of time, the annotated events comprising metadata instances that have semantic information about the events;
      generate mappings between the content items and the annotated events, and between the content items and a plurality of topics;
      determine a first affinity score between a first population of the users who authored content items mapped to a first one of the events or a first one of the topics and a second population of the users who authored content items mapped to a second one of the events or a second one of the topics;
      determine a second affinity score between a third population of the users who authored content items mapped to a third one of the events or a third one of the topics and a fourth population of the users who authored content items mapped to a fourth one of the events or a fourth one of the topics;
      determine a third affinity score between the second population and the fourth population; and
      infer a fourth affinity score between the first population and third population based on the first, second, and third affinity scores.

20. The system of claim 19, wherein generating the mappings comprises
   performing a feature extraction process on pairs including one of the content items and one of the events or one of the topics, the feature extraction generating content features that identify co-occurring textual information between the content item and the metadata instances of the annotated event or one or more keywords associated with the topic of the pair; and
   generating scores for the content features indicating whether the content items refers to the annotated events or topics using a feature specific sub-function for the content feature.

21. The system of claim 19, wherein the computer server is further configured to:
   access programming information regarding the events of time based broadcast media; and
   annotate the events using an alignment function to estimate the likelihood that the events are described by the metadata instances.

22. The system of claim 19, wherein determining one of the affinity scores comprises:
   determining an intersecting population of the users between one of the populations mapped to one of the events or topics, and another one of the populations mapped to the one of the events or topics;
   determining the affinity score based on the intersecting population.

23. The system of claim 22, wherein determining one of the affinity scores comprises calculating a weighted sum over the users in the intersecting population.

24. The system of claim 23,
   wherein a weight is assigned to each user in the intersecting population, and
   wherein each of the weights is determined based on at least one from the group consisting of:
      a number of times the user has authored one of the content items associated with one of the mappings, and
      a probability that the user will author a content item relevant to either the event or topic associated with one of the populations forming the intersecting population.

25. The system of claim 23, wherein determining the affinity score comprises normalizing the weighted sum by an average probability of users to author content items regarding the topics or events associated with intersecting population.

26. The system of claim 23, wherein determining the affinity score comprises normalizing the affinity score based on a number of users in the populations forming the intersecting population.

27. The system of claim 26, wherein determining the affinity score comprises normalizing the affinity score based on at least one from the group consisting of:
   a cardinality of the union between the users of the populations forming the intersecting population and
   a product of the cardinality between the populations forming the intersecting population.

* * * * *